Oct. 10, 1961  A. G. STIMSON ET AL  3,003,389
VIEWFINDER SIGNALS FOR PHOTOGRAPHIC CAMERAS
Filed Feb. 8, 1961
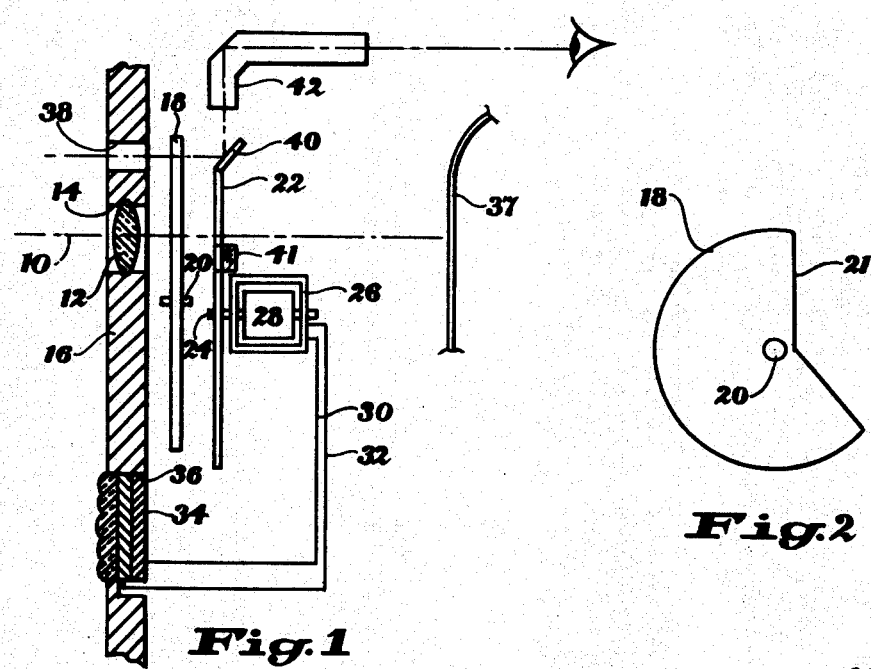
Fig.1
Fig.2
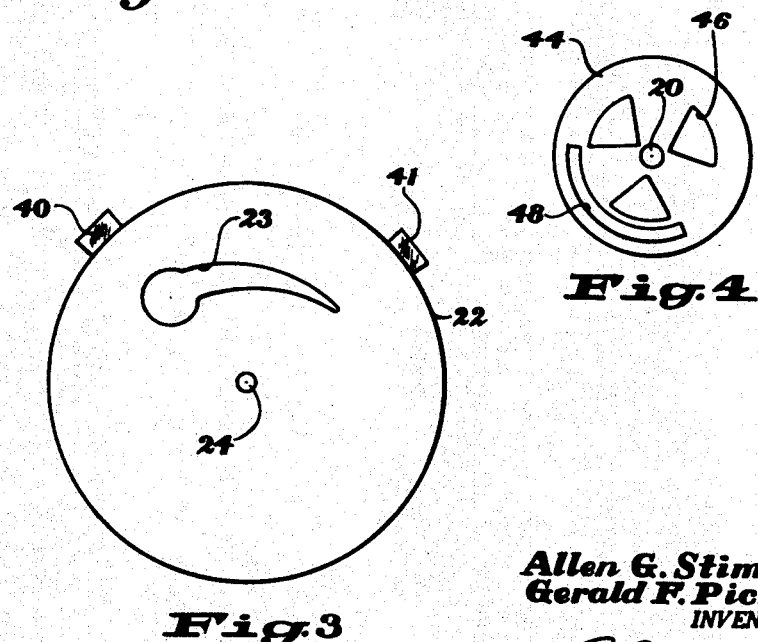
Fig.3
Fig.4
Allen G. Stimson
Gerald F. Pickens
INVENTORS
BY R. Frank Smith
Robert W. Hampton
ATTORNEYS

United States Patent Office 3,003,389
Patented Oct. 10, 1961

3,003,389
VIEWFINDER SIGNALS FOR PHOTOGRAPHIC CAMERAS
Allen G. Stimson and Gerald F. Pickens, Rochester, N.Y., assignors to Eastman Kodak Company, Rochester, N.Y., a corporation of New Jersey
Filed Feb. 8, 1961, Ser. No. 87,930
9 Claims. (Cl. 88—16)

The present invention relates to photographic cameras having automatic exposure control systems and more particularly concerns an improved viewfinder signal for indicating to the camera operator when the scene brightness is below the normal photographic range for the camera.

In prior art cameras having automatic exposure control systems, excessively low scene brightness has been indicated in the viewfinder in several ways, including the appearance or disappearance of a spot of light in the viewfinder. This spot of light has been produced generally by scene light which is transmitted into the viewfinder along a path which may be blocked or unblocked by one or more members moved by the exposure control system. However, in low-light situations it is obvious that at the very time the signal is required, the source of the signal is weakest; consequently, the appearance or disappearance of the spot of light at the critical time tends to go unnoticed by the camera operator.

It is therefore a primary object of the present invention to render a spot of light in the viewfinder more visible to the camera operator than has been the case in prior art low-light signals. This object is accomplished in accordance with the invention, by producing a flicker in the spot of light, which has been found to be far more noticeable than a steady spot of light.

It is a further object of the invention to transmit light from the exterior of a camera into the viewfinder of the camera along a path through which a portion of a rotating shutter member passes, in order to produce flicker in the light beam.

Other objects of the invention will appear from the following description, reference being made to the accompanying drawings, wherein:

FIG. 1 is a side view of the essential elements of a camera incorporating the present invention, partly in section;

FIG. 2 is a front view of one form of shutter useable with the invention;

FIG. 3 is a front view of a form of diaphragm disk that may be employed with the invention; and FIG. 4 is a front view of a second form of shutter that may be employed with the invention.

Referring to FIG. 1, the invention is illustrated in the environment of a motion picture camera having a taking lens axis 10 on which is arranged a taking lens 12 mounted in an aperture 14 of a camera wall 16. Also arranged on the taking lens axis 10 is an opaque shutter member 18, which is rotatable in any well known manner about an axis 20. A front view of the shuttter is shown in FIG. 2, which shows a cutout section 21 that is employed to produce shutter action during rotation of member 18.

A diaphragm member 22 (FIGS. 1 and 3) is arranged for rotation about an axis 24 of the pivoted coil 26 of a measuring instrument 28. A tear drop aperture 23 in diaphragm disk 22 is disposed for arcuate movement with the disk through a path such that the lens axis 10 passes through the aperture. Coil 26 is connected by leads 30 and 32 to a photocell 34, which is disposed in an aperture 36 of the camera wall 16 for illumination by scene light.

Light from the exterior of the camera passes through a third aperture 38 in camera wall 16 along a path intersected by the periphery of shutter 18 and by either of a pair of mirrors 40 and 41 mounted on the periphery of diaphragm disk 22 and extending diagonally rearward out of the plane of that disk. When the scene brightness is at the low or high limit of the normal automatic exposure range of the camera (as determined by the characteristics of cell 34, instrument 28 and diaphragm aperture 23), mirror 40 or 41, respectively, is aligned with the light beam transmitted through aperture 38 and reflects this light beam into the camera viewfinder through one or more reflecting surfaces, such as formed in a Lucite rod or the like, indicated generally at 42. Mirrors 40 and 41 may be of different colors to indicate whether the flickering signal refers to inadequate or excessive light for exposing the film. This light beam is interrupted by the periphery of shutter 18 during each rotation of the shutter member. Even at normal shutter speeds, which produce satisfactory images on a film strip 37 without flicker, the foregoing structure has been found to produce a noticeable flicker in the light beam from aperture 38, as seen in the viewfinder. Therefore, the shutter periphery forms a modulator for the beam of light passing through aperture 38. In its preferred form, this modulator comprises opaque and cut-out areas of the shutter member, but it will be obvious that areas of different optical densities or colors would be an adequate substitute.

It will be understood that the shutter member illustrated in the drawings is merely a preferred form of cyclically moving member that may be employed to carry the beam-modulating surface or device. It will also be understood that the illustrated diaphragm vane or disk 22 is merely a preferred form of control member movable in an automatic exposure control system as a function of scene brightness and carrying reflecting surfaces, or mirrors 40 and 41. These reflecting surfaces can be carried by any member moving as a function of scene brightness, for example by a member moving in synchronism with the diaphragm vane.

If it is desired to make the signal beam in the viewfinder flicker more slowly and perhaps more noticeably, a form of shutter illustrated in FIG. 4 may be employed. This shutter has a plurality of apertures, such as 46, arranged to cross the lens axis 10. The shutter rotates at such speed that each of the apertures 46 exposes a single frame of film, all in a manner well known in the art. A single peripheral aperture 48 on the shutter member 44 is arranged to intercept the light beam passing from the exterior of the camera through aperture 38, and thereby successfully blocks and transmits that light beam at a lower flicker frequency than that caused by the cutout portion 21 of the shutter member 18 shown in FIG. 2. In the example illustrated in FIG. 4, the flicker frequency is one-third the frame frequency.

The invention has been described in detail with particular reference to preferred embodiments thereof, but it will be understood that variations and modifications can be effected within the spirit and scope of the invention as described hereinabove and as defined in the appended claims.

We claim:

1. In a camera having a viewfinder and having an automatic exposure control system for regulating the exposure of photographic film in said camera automatically, said control system including a diaphragm vane moved as a function of scene brightness, means for indicating in said viewfinder a predetermined low level of scene brightness, said means comprising: means for transmitting a light beam from the exterior of said camera through a predetermined path rearwardly into said viewfinder, whereby said beam is visible in said viewfinder, said transmitting means including a reflecting member supported by said diaphragm vane for movement therewith and disposed in said path for reflecting said light beam only when the position of said diaphragm vane corresponds to said low level of scene brightness; and a rotatable shutter member having respective cut-out and opaque portions disposed for sequential cyclic movement across said path for interrupting said light beam cyclically to produce a visible flicker in said beam.

2. The indicating means defined in claim 1, wherein said camera includes a front cover and wherein said transmitting means includes an aperture in said cover through which said light beam enters the camera in a direction toward the position of said reflecting member when said diaphragm vane occupies its position corresponding to said low level of scene brightness, and wherein said transmitting means further includes a light-conducting member disposed in said camera for receiving the light beam reflected from said reflecting member and for transmitting said beam rearwardly into said viewfinder.

3. The indicating means defined in claim 1, wherein said camera has a taking lens disposed on an axis and wherein said shutter member has only one cut-out portion movable across said path and has a plurality of taking apertures movable across said axis.

4. The indicating means defined in claim 1, with a second reflecting member supported by said diaphragm vane for movement therewith and disposed in said path for reflecting said light beam only when the position of said diaphragm vane corresponds to a predetermined high level of scene brightness.

5. The indicating means defined in claim 4, wherein said two reflecting members are of different colors.

6. In a camera having a viewfinder and having an automatic exposure control system for regulating the exposure of photographic film in said camera automatically, said control system including a control member moved as a function of scene brightness, means for indicating in said viewfinder a predetermined low level of scene brightness, said means comprising: means for transmitting a light beam from the exterior of said camera through a predetermined path rearwardly into said viewfinder, whereby said beam is visible in said viewfinder, said means including a reflecting member coupled to said control member for movement in synchronism therewith and disposed in said path for reflecting said light beam only when the position of said control member corresponds to said low level of scene brightness; and a modulating member having a light-modulating portion disposed for cyclic movement across said path for interrupting said light beam cyclically to produce a visible flicker in said beam.

7. The indicating means defined in claim 6, wherein said camera includes a front cover and wherein said transmitting means includes an aperture in said cover through which said light beam enters the camera in a direction toward the position of said reflecting member when said control member occupies its position corresponding to said low level of scene brightness, and wherein said transmitting means further includes a light-conducting member disposed in said camera for receiving the light beam reflected from said reflecting member and for transmitting said beam rearwardly into said viewfinder.

8. The indicating means defined in claim 6, with a second reflecting member coupled to said control member for movement in synchronism therewith and disposed in said path for reflecting said light beam only when the position of said control member corresponds to a predetermined high level of scene brightness.

9. The indicating means defined in claim 8, wherein said two reflecting members are of different colors.

No references cited.